US009164250B2

(12) United States Patent
Mogul et al.

(10) Patent No.: US 9,164,250 B2
(45) Date of Patent: Oct. 20, 2015

(54) REPLACEABLE MODULAR OPTICAL CONNECTION ASSEMBLY

(75) Inventors: Jeffrey Clifford Mogul, Menlo Park, CA (US); Dwight L. Barron, Houston, TX (US); Kevin B. Leigh, Houston, TX (US); Jayaram Mudigonda, San Jose, CA (US); Praveen Yalagandula, San Francisco, CA (US); Guodong Zhang, Plano, TX (US); Terrel Morris, Garland, TX (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 14/384,986

(22) PCT Filed: Mar. 14, 2012

(86) PCT No.: PCT/US2012/029017
§ 371 (c)(1),
(2), (4) Date: Sep. 12, 2014

(87) PCT Pub. No.: WO2013/137870
PCT Pub. Date: Sep. 19, 2013

(65) Prior Publication Data
US 2015/0063771 A1 Mar. 5, 2015

(51) Int. Cl.
*G02B 6/00* (2006.01)
*G02B 6/44* (2006.01)
*G02B 6/43* (2006.01)

(52) U.S. Cl.
CPC .............. *G02B 6/4452* (2013.01); *G02B 6/43* (2013.01)

(58) Field of Classification Search
CPC ...... G02B 6/43; G02B 6/3608; G02B 6/4452; G02B 5/201
USPC ............. 385/53, 135; 361/788; 709/220, 221, 709/249; 710/35, 36
See application file for complete search history.

(56) References Cited

U.S. PATENT DOCUMENTS

| 5,724,466 | A | * | 3/1998 | Rickenbach et al. ........... 385/60 |
| 5,793,909 | A | * | 8/1998 | Leone et al. .................... 385/24 |
| 5,980,312 | A | | 11/1999 | Chapman et al. |
| 6,334,784 | B1 | * | 1/2002 | Howard ........................ 439/260 |
| 6,623,177 | B1 | | 9/2003 | Chilton |
| 6,931,211 | B2 | * | 8/2005 | English et al. ................ 398/164 |
| 7,246,178 | B2 | * | 7/2007 | Roberts et al. ................ 709/249 |
| 7,466,924 | B2 | * | 12/2008 | English et al. ................ 398/164 |

(Continued)

OTHER PUBLICATIONS

Ahn et al., HyperX: Topology, Routing and Packaging of Efficient Large-Scale Networks 2009 ACM 978-1-60558-744-8/-0/11 (11 pages).

(Continued)

*Primary Examiner* — Peter Radkowski
(74) *Attorney, Agent, or Firm* — Trop, Pruner & Hu, P.C.

(57) ABSTRACT

Connectors of a first removable modular optical connection assembly, having a first predefined arrangement of optical signal conduits, are connected to respective connectors on a support structure that are optically connected to corresponding devices. The first modular optical connection assembly is replaceable with a second modular optical connection assembly having a second, different predefined arrangement of optical signal conduits, to change a topology of a network.

21 Claims, 8 Drawing Sheets

(56) References Cited

U.S. PATENT DOCUMENTS

| | | |
|---|---|---|
| 7,574,491 B2 | 8/2009 | Stein et al. |
| 2002/0025122 A1 | 2/2002 | Ouchi et al. |
| 2002/0039468 A1* | 4/2002 | Lin .................................. 385/17 |
| 2003/0039014 A1* | 2/2003 | English ........................ 359/163 |
| 2005/0213989 A1* | 9/2005 | English et al. ................ 398/164 |
| 2009/0216920 A1 | 8/2009 | Lauterbach et al. |
| 2010/0110932 A1 | 5/2010 | Doran et al. |
| 2010/0142544 A1 | 6/2010 | Chapel et al. |

OTHER PUBLICATIONS www.telecent.com—LIGHTSTITCH Automated Cross-Connect dated on or before Jan. 12, 2012 (3 pages).

\* cited by examiner

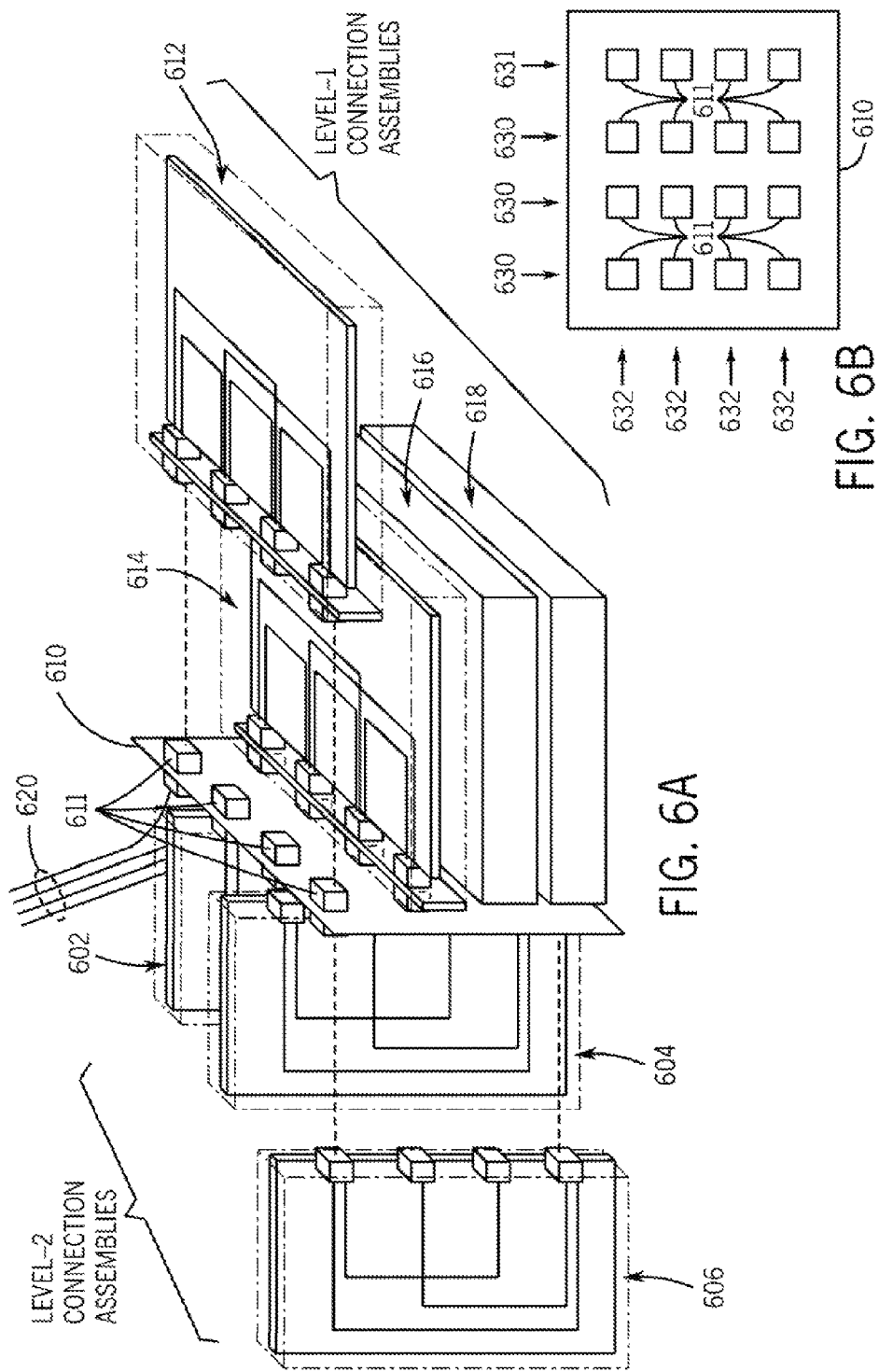

REPLACEABLE MODULAR OPTICAL CONNECTION ASSEMBLY

CROSS-REFERENCE TO RELATED APPLICATION

This application is a national stage application under 35 U.S.C. §371 of PCT/US2012/029017, filed Mar. 14, 2012.

BACKGROUND

A system can include various electronic devices that are interconnected using a network, which can include communications links and intermediate devices (e.g. switches) that are able to route data among the electronic devices. Networks can have various different topologies—for a given system, use of different network topologies can result in different network performance. One measure of network performance is the bandwidth that can be provided by the network for the communication of data among electronic devices.

BRIEF DESCRIPTION OF THE DRAWINGS

Some embodiments are described with respect to the following figure

FIGS. 1-6B are schematic diagrams of example systems employing modular optical connection assembly (or assemblies), in accordance with various implementations;

DETAILED DESCRIPTION

Figure 1:
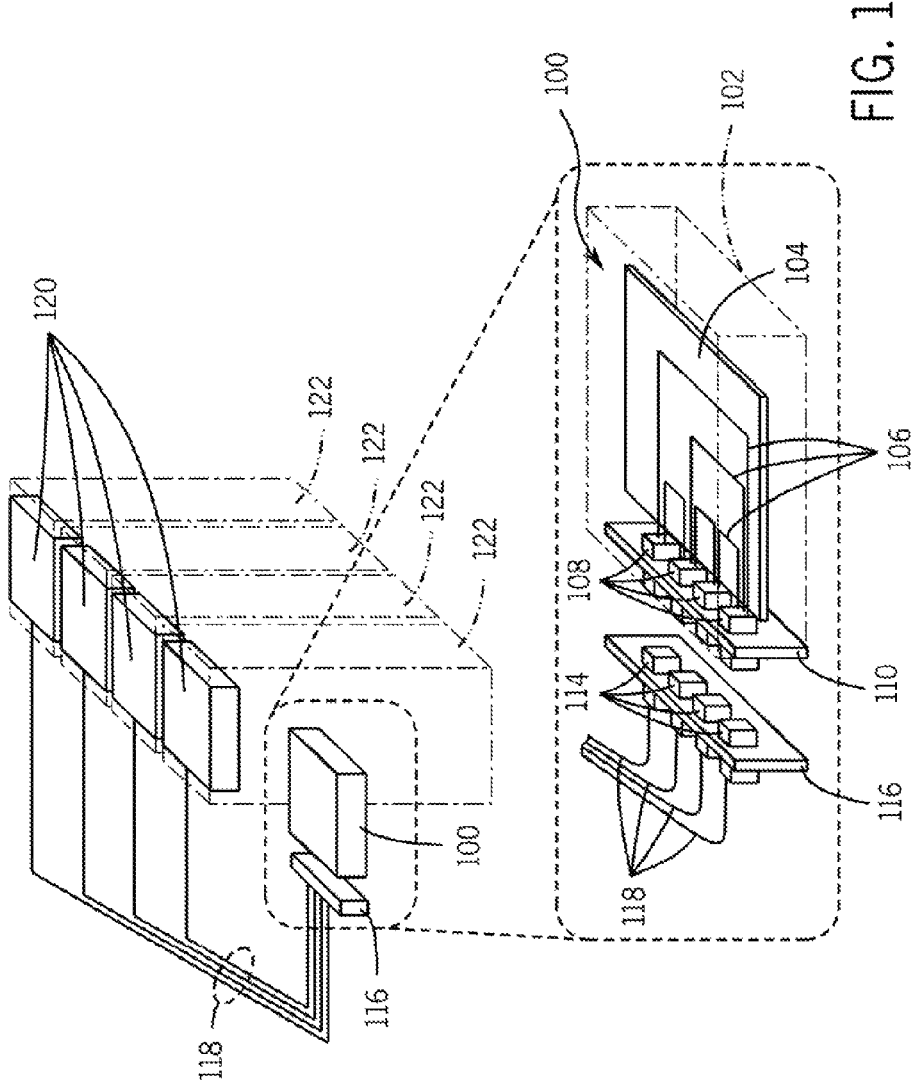

In implementing a system of electronic devices that are to be interconnected by a network, an enterprise (e.g. business concern, educational organization, government agency, individual, etc) can make various choices to balance performance and cost of the system. For example, an enterprise may have to select a topology of the network to use. There can be various different network topologies that may be selected by the enterprise. For a given system, different network topologies can have different performance levels (e.g. different data bandwidths) and corresponding different costs. In some cases, higher network performance may come at a higher cost, which may exceed a cost budget of the enterprise.

The electronic devices of a system can include server computers, storage devices, communication devices, and so forth. A network can include communication conduits, as well as switches coupled to the communication conduits to allow for communication among the electronic devices. There can be multiple levels of switches (e.g. a first level of switches that are connected to the electronic devices, a second level of switches to interconnect the first level of switches, and so forth). Generally, a "switch" can refer to any intermediate device that allows data to be passed between other devices. The switch can be a layer 2 switch, a layer 3 router, or some other type of intermediate communication device.

In some examples, the communication conduits of a network can include optical signal conduits, which can be in the form of optical fibers or optical waveguides. The communication conduits can also additionally include electrical wires in some examples. A specific arrangement of switches and communication conduits provides a particular network topology. Different arrangements of the switches and communication conduits would provide different network topologies. In some implementations, the network topology can be changed by changing the pattern of the communication conduits. A 'pattern' of communication conduits can refer to a specific connection arrangement of the communication conduits among switches, A manufacturer (or other provider) of a system may have multiple customers that may use the system for different applications. A system having a particular network topology may meet the goals (e.g. target network performance, target computing performance, target storage capacity/performance, target cost, etc.) of some customers but not the goals of other customers. On the other hand, it can be impractical for the manufacturer (or other provider) to provide systems having different custom network designs for corresponding different customers, since doing so may add to engineering and manufacturing expenses.

In addition, the goals (e.g. target network performance, target computing performance, target storage capacity/performance, target cast, etc.) of an enterprise may change over time, which may dictate a change in the network topology used in a system.

In accordance with some implementations, a manually replaceable modular optical connection assembly that has a predefined arrangement of optical signal conduits can be used to allow for a relatively convenient and cost-effective reconfiguration of the network topology used in a system. A predefined arrangement of optical signal conduits in the modular optical connection assembly can refer to a fixed arrangement of the optical signal conduits. In accordance with some implementations, a first modular optical connection assembly can be manually replaced with a second modular optical connection assembly that has a different predefined arrangement of optical signal conduits to reconfigure the network topology of the system, in some examples, a modular optical connection assembly can also include electrical conduits in addition to optical signal conduits.

The reconfiguration of the network topology in the system can be performed to conform to different goals of an enterprise at different times. For example, the first modular optical connection assembly can be designed for a first goal (e.g. target network performance, target cost, etc.) of the enterprise at a first time. The first modular optical connection assembly upon installation in a system can provide a first network topology. If the goals of the enterprise evolve over time, then the enterprise may decide at a later time that reconfiguration of the network topology of the system is desired. To perform such reconfiguration, the first modular optical connection assembly can be replaced with the second optical connection assembly in the system to implement a second, different network topology.

In other examples, different modular optical connection assemblies can be installed in different systems for different enterprises (which may be customers of a system manufacturer or other system provider). In this way, systems having different network topologies can be provided to different enterprises, which may have different goals.

A system can include one or multiple modular optical connection assemblies. To reconfigure a network topology of a system having multiple modular optical connection assemblies, one or several of the multiple modular optical connection assemblies can be replaced. Replacement of less than all of the modular optical connection assemblies in a system results in network topology reconfiguration of a portion less than an entirety of the system. If multiple modular optical connection assemblies are present in a system, an optical interconnect can be provided between or among the modular optical connection assemblies. This optical interconnect can be in the form of optical signal conduits (e.g. optical fiber bundles, etc.) or in the form of another modular optical connection assembly. In the latter example, the system is considered to have multiple (hierarchical) levels of modular optical connection assemblies, which can enhance flexibility and ease of implementing target network topologies in the system.

In addition, it can be possible to grow a system by adding additional modular optical connection assemblies. For example, an enterprise may decide that additional electronic devices are to be deployed in the system. To accommodate the additional electronic devices, additional modular optical connection assembly(ies) can be added to the system to interconnect the additional electronic devices to existing electronic devices. The added modular optical connection assembly(ies) can be connected by optical interconnect(s) to existing modular optical connection assembly(ies).

Also, in some examples, the use of modular optical connection assemblies according to some implementations can reduce the time, cost and error involved in servicing and/or upgrading network topologies, compared to a solution in which manual re-cabling is performed.

FIG. 1 illustrates an example arrangement of a system that includes a modular optical connection assembly 100. The modular optical connection assembly 100 has an external housing 102 (which is shown as being transparent to allow viewing of the inner components of the modular optical connection assembly 100). In examples according to FIG. 1, the housing 102 defines an inner chamber in which an optical wiring panel 104 is provided. The optical wiring panel 104 can include multiple layers, where one layer can be a sheet on which optical fibers are placed to provide an optical wiring pattern 106. For example, the sheet can be a polyester sheet (e.g. MYLAR® polyester sheet) on which an optical wiring pattern is printed or formed. The optical wiring panel 104 can include multiple sheets of optical fibers, along with protective layers.

The optical fibers of the optical wiring panel 104 are connected to optical connectors 108, which are mounted through a support plate 110 of the modular optical connection assembly 100. Portions of the optical connectors 108 that protrude outwardly away from the housing 102 of the modular optical connection assembly 100 are configured for blind mating with respective connectors 114 that are mounted to a back panel 116 or other support structure.

A "blind-mate optical connection" between optical connectors refers to an optical connection in which one optical connector can be connected to another optical connector, with alignment between the optical connectors being automatically performed using alignment features, such that a user does not have to visually align connectors to make the connection.

The back panel 116 or other support structure can be attached to any component in the system depicted in FIG. 1, such as to one of multiple racks 122 in the system, or to any other housing or fixed structure.

Optical cables 118 connect the optical connectors 114 on the back panel 116 to respective communication modules 120, which can be switches in some examples. In examples according to FIG. 1, the communication modules 120 can be rack switches that are provided in respective racks 122 of the system. Each rack 122 defines a containment structure that houses a corresponding rack switch 120 as well as electronic devices that communicate with the rack switch 120 (note that the outer housing of the racks 122 are made transparent to allow the communication modules 120 to be seen). The electronic devices are not shown in the FIG. 1 for simplicity. The electronic devices can include server computers, storage devices, and so forth. In some cases, the electronic devices in each rack 122 can further include other switches that are in turn connected to the respective rack switch. In some examples, the rack switches can be referred to as top-of-rack switches.

In other examples, each of the communication modules 120 can include an assembly of multiple devices, such as blade servers and a switch (or multiple switches).

Although the modular optical connection assembly 100 in FIG. 1 is depicted as a module that has a housing containing inner components, in other implementations, the modular optical connection assembly 100 can be implemented without the housing 102.

Additionally, although the modular optical connection assembly 100 is implemented with an optical wiring panel 104 in some implementations, the optical wiring panel 104 can be replaced with bundles of optical fibers, such as loose optical fiber cables (where each cable includes multiple optical fibers) or ribbonized optical fibers (where optical fibers are carried on a relatively flat carrier).

Figure 2:
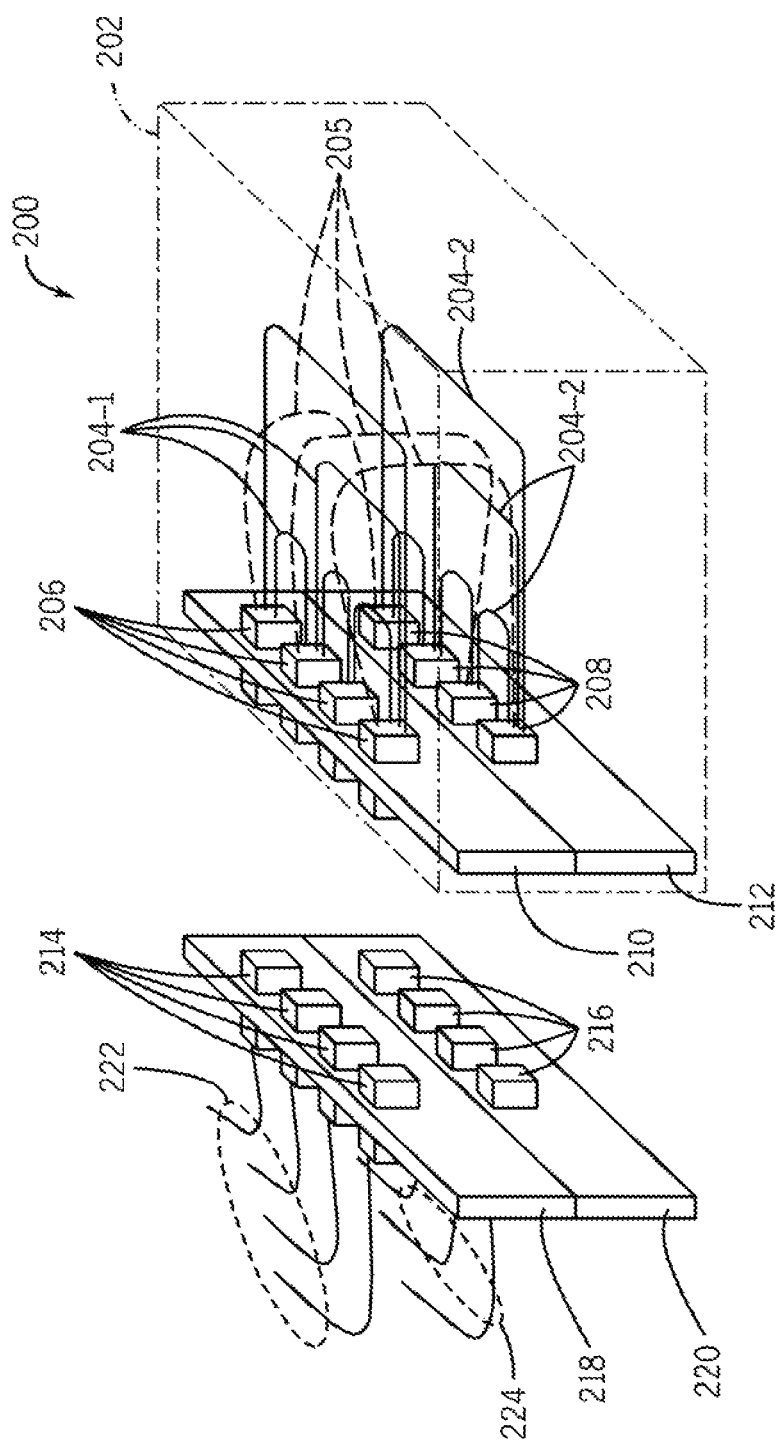

FIG. 2 illustrates an example modular optical connection assembly 200 according to different implementations. The modular optical connection assembly 200 is a multi-dimensional connection assembly (more specifically a two-dimensional connection assembly in FIG. 2). The modular optical connection assembly 200 has a housing 202 (also made transparent in the view of FIG. 2) defining an inner chamber in which a predefined arrangement of loose optical cables 204-1, 204-2, and 205 are provided. The optical cables 204-1 interconnect optical connectors 206, while the optical cables 204-2 interconnect optical connectors 208. Each set of the optical cables 204-1 and 204-2 is used to interconnect optical connectors along a first dimension (e.g. the optical cables 204-1 interconnect optical connectors 206 of a first row, and the optical cables 204-2 interconnect optical connectors 208 of a second row).

The optical cables 205 (shown as dashed lines) interconnect optical connectors 206 and 208 along a second dimension (e.g. a column)—in other word each optical cable 205 interconnects an optical connector 206 to a corresponding optical connector 208.

The optical connectors 206 are mounted to a first support plate 210, and the optical, connectors 208 are mounted to a second support plate 212. In other examples, the optical connectors 206 and 208 can both be connected to the same support plate.

The optical connectors 206 and 208 can be blind-mated to respective groups of optical connectors 214 and 216 mounted to respective back panels 218 and 220. In other examples, the optical connectors 214 and 216 can be mounted to the same back panel. The optical connectors 214 can be connected by optical cables 222 to a first group of racks while the optical cables 224 can be connected to a second group of racks in the system. The arrangement shown in FIG. 2 can support connections to a larger number of racks than the arrangement shown in FIG. 1. The two-dimensional connection assembly 200 allows for optical communication between the first and second groups of racks.

Figure 3:
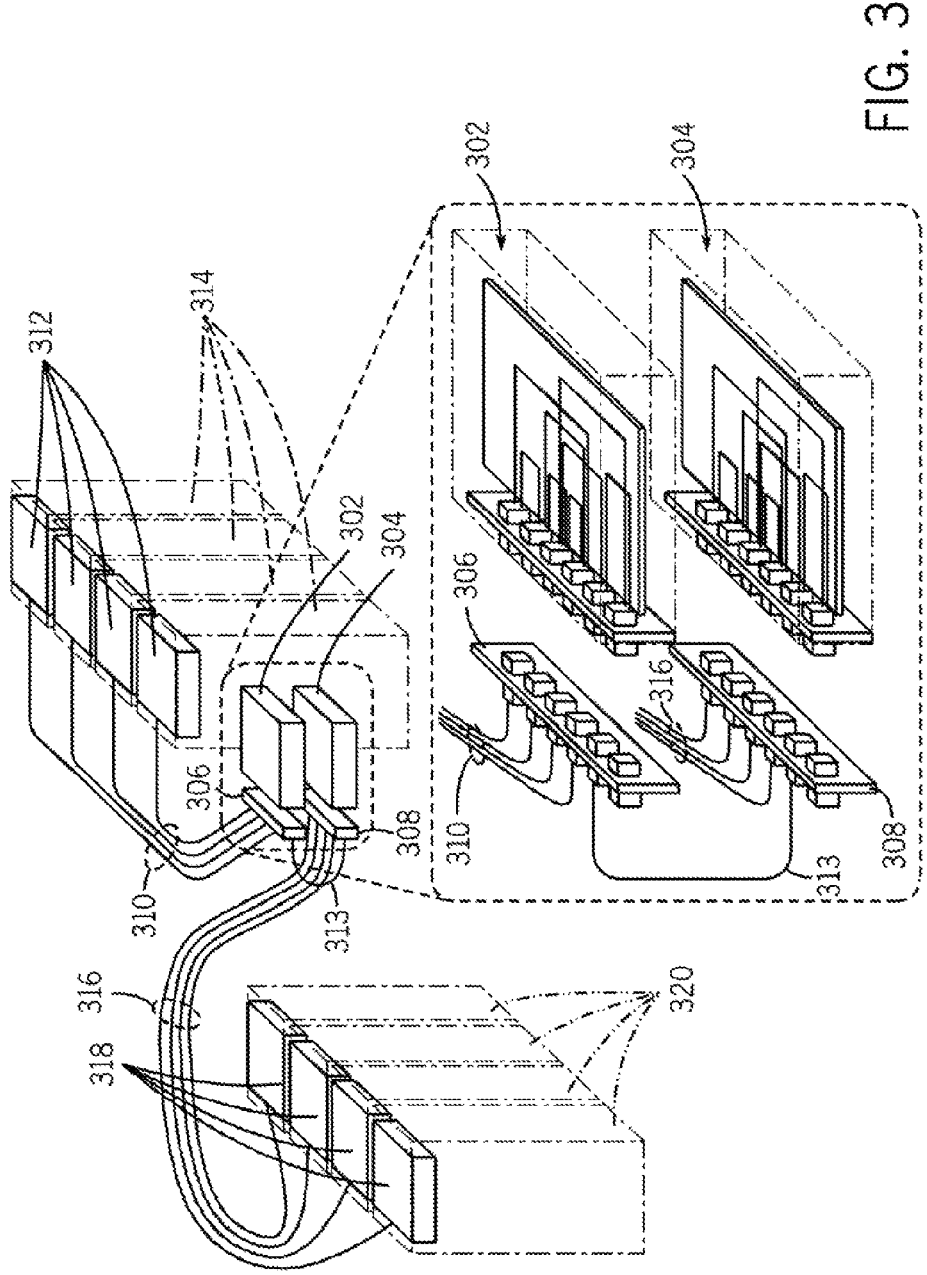

FIG. 3 shows another example arrangement, which includes multiple modular optical connection assemblies 302 and 304 (each arranged similarly as the modular optical connection assembly 100 of FIG. 1). Alternatively, each of the modular optical connection assemblies 302 and 304 can be configured according to the arrangement of the modular optical connection assembly 200 depicted in FIG. 2.

The modular optical connection assemblies 302 and 304 are blind-mated to optical connectors mounted on respective back panels 306 and 308. Optical cables 310 connect the optical connectors on the back panel 306 to the communication modules 312 of a first group of racks 314. Optical cables 316 connect the optical connectors on the support panel 308 to respective communication modules 318 in a second group of racks 320. In addition, an interconnect 313 is provided between the back panels 306 and 308, to allow the modular optical connection assemblies 302 and 304 to be connected to each other. The interconnect 313 can be in the form of an optical cable (or multiple optical cables), in some examples.

Figure 4:
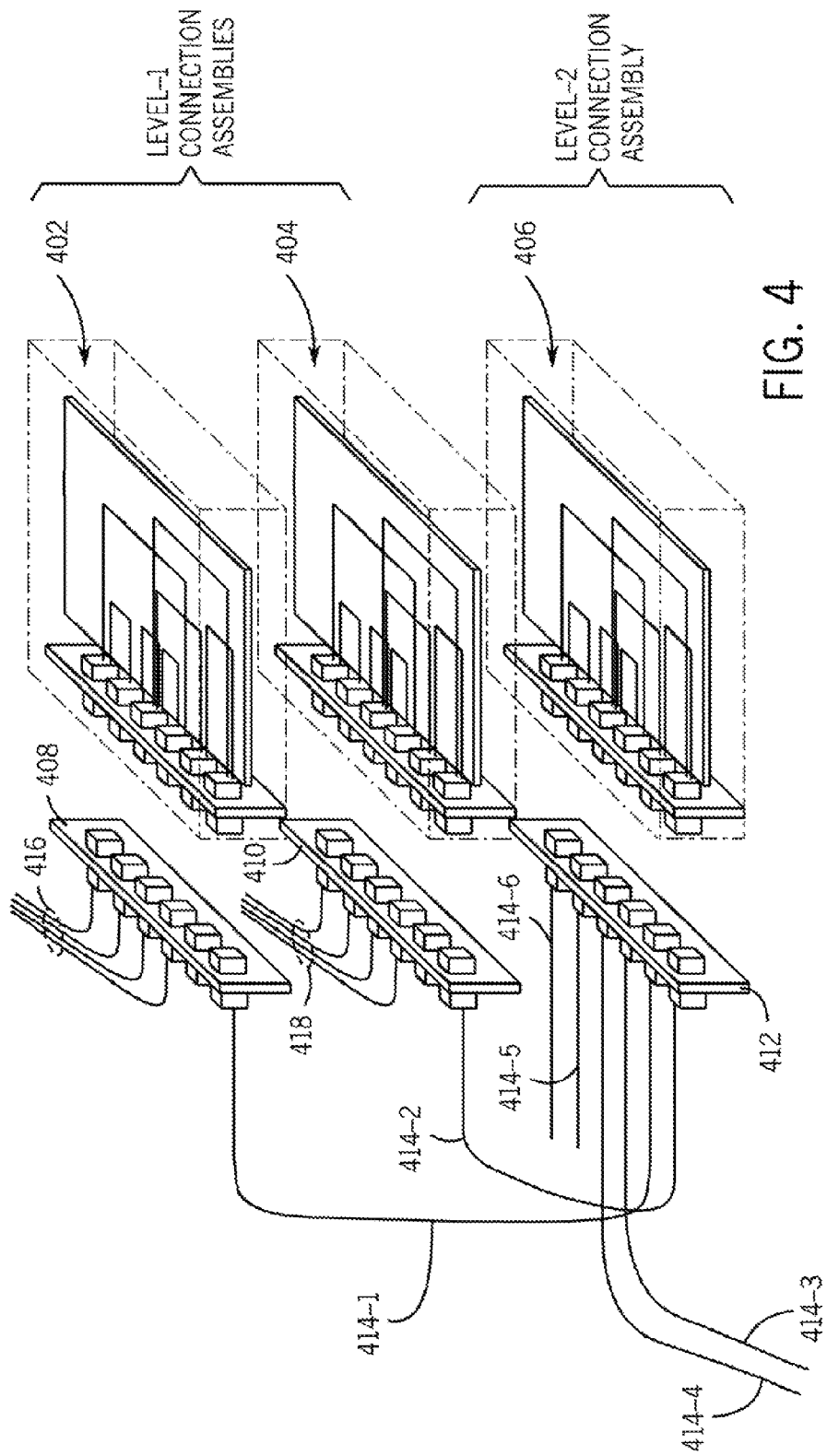

FIG. 4 illustrates an arrangement according to alternative implementation The FIG. 4 arrangement includes multiple levels of modular optical connection assemblies. In examples according to FIG. 4, modular optical connection assemblies 402 and 404 are at a first level, while a modular optical connection assembly 406 is at a second level. The outer housings of each of the modular optical connection assemblies 402, 404, and 406 are made transparent to allow viewing of internal components. In examples according to FIG. 4, each of the modular optical connection assemblies 402, 404, and 406 are configured similarly as the modular optical connection assembly 100 of FIG. 1. In other examples, one or multiple ones of the modular optical connection assemblies 402, 404, and 406 can be configured differently.

The level-2 modular optical connection assembly 406 is used for interconnecting the level-1 modular optical connection assemblies 402 and 404. The optical connectors of the level-1 optical connection assemblies 402 and 404 can be blind-mated to corresponding optical connectors on respective back panels 408 and 410. A first set of optical cables 416 connect a subset of the optical connectors on the back panel 408 to a group of racks, while a second set of optical cables 418 connect a subset of the optical connectors on the back panel 410 to another group of racks.

The optical connectors of the level-2 modular optical connection assembly 406 are blind-mated to corresponding optical connectors of a back panel 412. The optical connectors of the back panel 412 are in turn connected by inter-connection assembly optical cables (414-1, 414-2, 414-3, 414-4, 414-5, and 414-6) to corresponding back panels that are connected to level-1 modular optical connector assemblies. For example, the inter-connection assembly optical cable 414-1 connects an optical connector on the back panel 412 to a respective optical connector on the back panel 408, while the optical cable 414-2 connects an optical connector on the back panel 412 to a respective optical connector on the back panel 410. The remaining optical cables 414-3 through 414-6 (connected to other respective optical connectors on the back panel 412) are similarly connected to other back panels that are in turn connected to level-1 modular optical connection assemblies (not shown in FIG. 4).

Optical communications among the level-1 modular optical connection assemblies (including 402 and 404) occur through respective ones of the inter-connection assembly cables (414-1 through 414-6) and the level-2 modular optical connection assembly 406. For example, optical communication between the level-1 modular optical connection assemblies 402 and 404 occurs through inter-connection assembly optical cables 414-1, 414-2 and the level-2 modular optical connection assembly 406.

Figure 5:
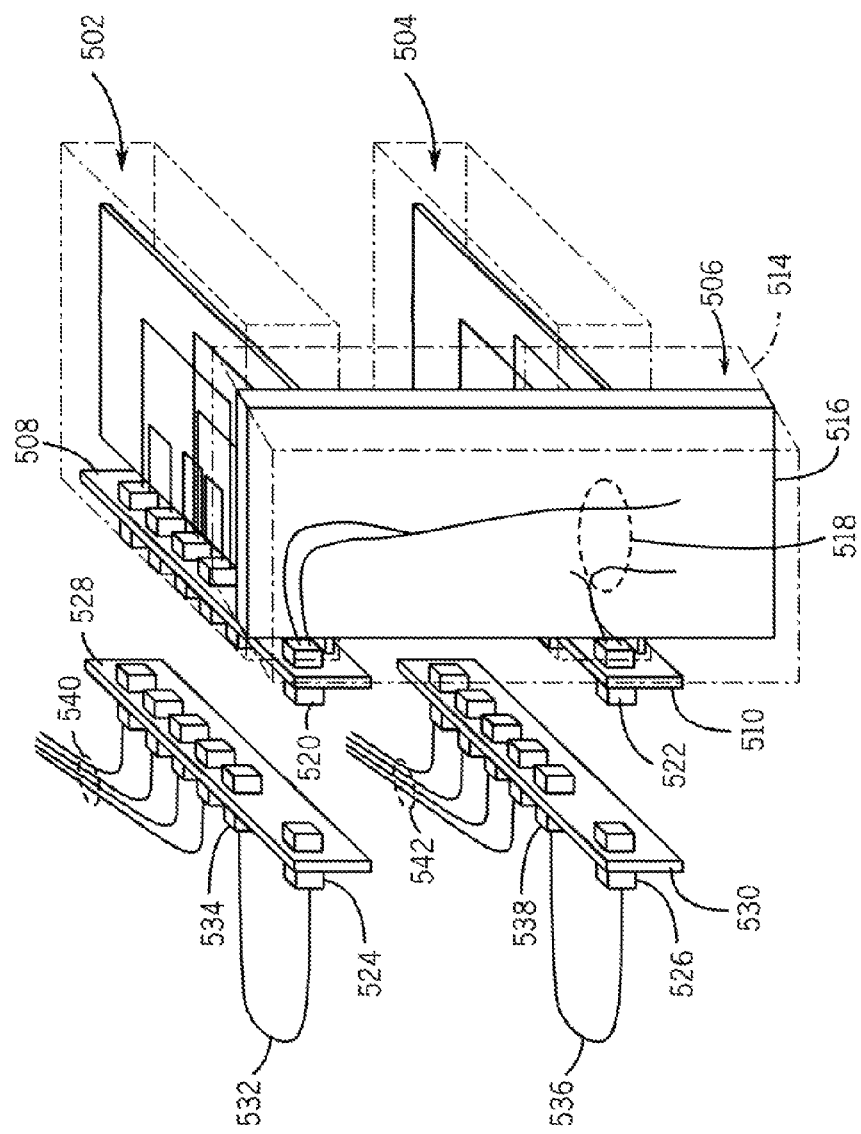

FIG. 5 illustrates a different example arrangement that includes level-1 modular optical connection assemblies 502, 504, and a level-2 modular optical connection assembly 506. The level-2 modular optical connection assembly 506 is connected to optical connectors of respective support plates 508 and 510 of the level-1 modular optical connection assemblies 502 and 504.

The level-2 modular optical connection assembly 506 has a housing 514 defining an inner chamber in which an optical wiring panel 516 is provided (where the optical wiring panel 516 defines a pattern of optical signal conduits 518). The optical connectors of the level-2 modular optical connection assembly 506 are connected to respective optical connectors 520 and 522 on the support plates 508 and 510, respectively. The optical connectors 520 and 522 are in turn blind-mated to respective optical connectors 524 and 526 of corresponding back panels 528 and 530.

The optical connector 524 on the back panel 528 is connected by an optical cable 532 to another optical connector 534 on the back panel 528. Similarly, the optical connector 526 on the back panel 530 is connected by an optical cable 536 to another optical connector 538 on the back panel 530. The optical cables 532 and 536 are inter-connection assembly optical cables to allow for interconnection between the level-1 modular optical connection assemblies 502 and 504 using the level-2 modular optical connection assembly 506. Stated differently, optical communication between the level-1 modular optical connection assemblies 502 and 504 occur through the inter-connection assembly optical cables 532, 536 and the level-2 modular optical connection assembly 506.

Alternatively, note that instead of using the optical cable 532, an optical signal conduit can be integrally formed with the back panel 528. Similarly, the optical cable 536 can be replaced with an optical signal conduit integrally formed with the back panel 530.

As further shown in FIG. 5, a first set of optical cables 540 connect a subset of the optical connectors on the back panel 528 to a first group of racks, while a second set of optical cables 542 connect a subset of the optical connectors on the back panel 530 to a second group of racks.

FIG. 6A illustrates an arrangement that has multiple level-2 modular optical connection assemblies 602, 604, 606, which are connected to respective optical connectors 611 of a mid-panel interconnect infrastructure 610. In addition, level-1 modular optical connection assemblies 612, 614, 616, and 618 are connected to respective optical connectors 611 of the mid-panel interconnect infrastructure 610.

The level-2 modular optical connection assemblies 602, 604, and 606 are provided on a first side of the mid-panel interconnect infrastructure 610, while the level-1 modular optical connection assemblies 612, 614, 616, and 618 are provided on a second side of the mid-panel interconnect infrastructure 610 (where the second side is opposite of the first side).

FIG. 6B provides a front view of the mid-panel interconnect infrastructure 610, which shows the connectors 611 arranged in an array as rows and columns. The optical connectors of the level-2 optical connection assemblies 602, 604 and 606 are blind-mated to respective columns 630 of optical connectors 611 on the mid-panel interconnect infrastructure 610 (on the backside of the mid-panel interconnect infrastructure 610 in the view of FIG. 6B). In addition, optical cables 620 are connected to another column 631 of the optical connectors on the mid-panel interconnect infrastructure 610 (also on the backside of the mid-panel interconnect infrastructure 610 in the view of FIG. 6B). The optical cables 620 are further connected to racks.

The optical connectors of the level-1 modular optical connection assemblies 612, 614, 616, and 618 are connected to respective rows 632 of optical connectors on the mid-panel interconnect infrastructure 610 (on the front side of the mid-panel interconnect infrastructure 610 in the view of FIG. 6B).

Figure 7B:
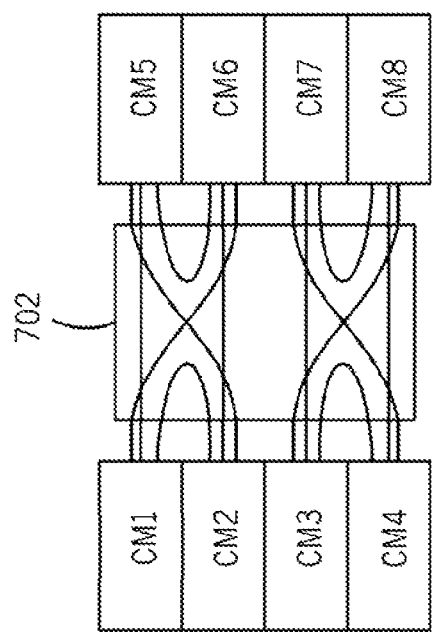
FIGS. 7A-7B are block diagrams of example systems that employ a modular optical connection assembly according to some implementations.
Figure 7A:
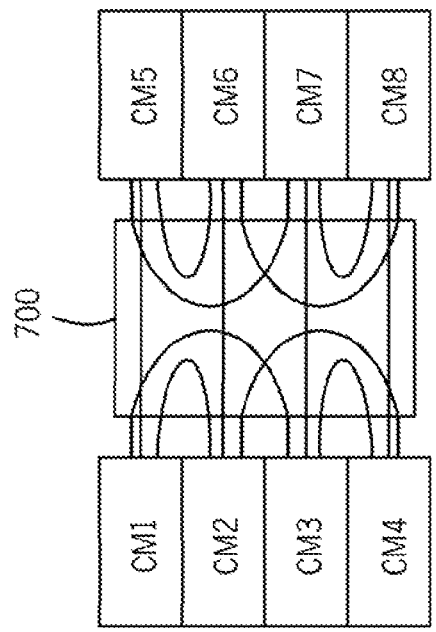

FIGS. 7A-7B are schematic views of example arrangements that employ modular optical connection assemblies to interconnect communication modules (CM1 through CM8). FIG. 7A depicts a first modular optical connection assembly 700 to interconnect the communication modules CM1 through CM8. The communication modules CM1 through CM4 can be part of a rack (or corresponding racks), and the communication modules CM5 through CM8 can be part of a rack (or corresponding racks). The first modular optical connection assembly 700 provides a first network topology.

FIG. 7B shows deployment of a second modular optical connection assembly 702, which replaces the first modular optical connection assembly 700. The second modular optical connection assembly 702 provides a different network topology for interconnecting the communication modules CM1 through CM8.

Figure 8:
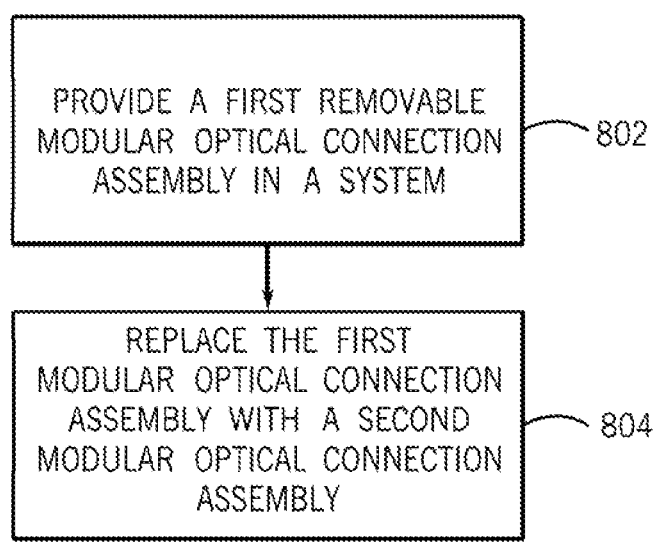
FIG. 8 is a flow diagram of a process according to some implementations.

FIG. 8 is a flow diagram of a process of providing a system according to some implementations. Initially, the process provides (at 802) a first removable optical connection assembly in a system, where optical connectors of the first modular optical connection assembly (which has a first predefined arrangement of optical signal conduits) are connected to respective optical connectors of a structure (e.g. back panel 116, 218, 220, 306, 308, 408, 410, 528, or 530 of FIGS. 1-5, respectively, or the mid-panel connection infrastructure 610 of FIG. 6). The optical connectors of the structure are optically connected to corresponding devices.

Later, the process of FIG. 8 replaces (at 804) the first modular optical connection assembly with a second modular optical connection assembly having a second, different predefined arrangement of optical signal conduits, to change a topology of a network interconnecting the devices.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
connecting connectors of a first removable modular optical connection assembly, having a first predefined arrangement of optical signal conduits, to respective connectors on a support structure that are optically connected to corresponding devices, the first modular optical connection assembly comprising a housing providing an inner chamber in which the optical signal conduits are contained, wherein portions of the connectors of the first modular optical connection assembly protrude outwardly away from the housing; and
replacing the first modular optical connection assembly with a second modular optical connection assembly having a second, different predefined arrangement of optical signal conduits contained in an inner chamber of a housing of the second modular optical connection assembly, to change a topology of a network interconnecting the devices, wherein portions of the connectors of the second modular optical connection assembly protrude outwardly away from the housing of the second modular optical connection assembly.

2. The method of claim 1, wherein the support structure comprises a back panel.

3. The method of claim 1, wherein connecting the connectors of the first modular optical connection assembly to the connectors of the support structure comprises connecting using blind-mate connectors.

4. The method of claim 1, wherein at least a particular one of the first and second modular optical connection assemblies includes a respective patch panel having a corresponding arrangement of optical fibers.

5. The method of claim 1, further comprising coupling, using optical signal conduits, a third modular optical connection assembly to the second modular optical connection assembly, wherein the third modular optical connection assembly is to optically communicate with further devices.

6. The method of claim 4, wherein coupling the third modular optical connection assembly to the second modular optical connection assembly is performed using a fourth modular optical connection assembly.

7. The method of claim 6, further comprising connecting the second, third, and fourth modular optical connection assemblies to optical connectors on the support structure.

8. The method of claim 6, further comprising:
connecting the third and fourth modular optical connection assemblies to optical connectors on additional support structures; and
interconnecting the support structures using optical cables.

9. The method of claim 1, wherein the connectors of the first modular optical connection assembly are interconnected in multiple different dimensions.

10. A first modular connection assembly comprising:
housing providing an inner chamber;
a first arrangement of optical signal conduits in the inner chamber and providing a first network topology; and
connectors connected to the first arrangement of optical signal conduits and detachably connectable to a support structure that is coupled to a group of devices, wherein connection of the connectors to the support structure allows the devices to communicate over the optical signal conduits, wherein portions of the connectors protrude outwardly away from the housing,
wherein the first modular connection assembly is detachable from the support structure for replacement with a second modular connection assembly having connectors connectable to the support structure, and a second arrangement of optical signal conduits providing a second, different network topology and contained in an inner chamber of a housing of the second modular optical connection assembly, wherein portions of the connectors of the second modular optical connection assembly protrude outwardly away from the housing of the second modular optical connection assembly.

11. The first modular connection assembly of claim 10, further comprising a patch panel having the optical signal conduits of the first modular connection assembly.

12. The first modular connection assembly of claim 10, wherein the optical signal conduits include bundles of optical fibers.

13. A system comprising:
electronic devices;
a support structure having optical connectors, the optical connectors being optically coupled to the electronic devices; and
a first modular optical connection assembly comprising a housing and optical connectors removably connected to the optical connectors of the support structure, wherein the first modular optical connection assembly has a first arrangement of optical signal conduits connected to the connectors and providing a first network topology, the optical signal conduits contained in an inner chamber of the housing, and portions of the connectors protruding outwardly away from the housing, and wherein the first modular optical connection assembly is detachable from the support structure for replacement with a second modular connection assembly comprising a housing and optical connectors connectable to the optical connectors of the support structure, and a second arrangement of optical signal conduits providing a second, different network topology, the optical signal conduits of the second modular optical connection assembly contained in an inner chamber of the housing of the second modular optical connection assembly, and portions of the connectors of the second modular optical connection assembly protruding outwardly away from the housing of the second modular optical connection assembly.

14. The system of claim 13, further comprising a third modular optical connection assembly having optical connectors for connection to optical connectors of the support structure or optical connectors of another support structure, wherein the third modular optical connection assembly has an arrangement of optical signal conduits providing a respective network topology, wherein the first modular optical connection assembly is replaceable with the second modular optical connection assembly without replacing the third modular optical connection assembly.

15. The system of claim 14, further comprising an optical interconnect to interconnect the second and third modular optical connection assemblies.

16. The method of claim 1, wherein the optical signal conduits of the first modular optical connection assembly have a first optical wiring pattern and are arranged on an optical wiring panel inside the housing of the first modular optical connection assembly, and wherein the optical signal conduits of the second modular optical connection assembly have a second optical wiring pattern and are arranged on an optical wiring panel inside the housing of the second modular optical connection assembly, the second optical wiring pattern different from the first optical wiring pattern.

17. The method of claim 16, wherein the optical wiring panel of the first modular optical connection assembly comprises a sheet on which the optical signal conduits are placed.

18. The first modular connection assembly of claim 10, wherein the optical signal conduits of the first modular optical connection assembly have a first optical wiring pattern and are arranged on an optical wiring panel inside the housing of the first modular optical connection assembly, and wherein the optical signal conduits of the second modular optical connection assembly have a second optical wiring pattern and are arranged on an optical wiring panel inside the housing of the second modular optical connection assembly, the second optical wiring pattern different from the first optical wiring pattern.

19. The first modular connection assembly of claim 18, wherein the optical wiring panel of the first modular optical connection assembly comprises a sheet on which the optical signal conduits are placed.

20. The system of claim 13, wherein the optical signal conduits of the first modular optical connection assembly have a first optical wiring pattern and are arranged on an optical wiring panel inside the housing of the first modular optical connection assembly, and wherein the optical signal conduits of the second modular optical connection assembly have a second optical wiring pattern and are arranged on an optical wiring panel inside the housing of the second modular optical connection assembly, the second optical wiring pattern different from the first optical wiring pattern.

21. The system of claim 20, wherein the optical wiring panel of the first modular optical connection assembly comprises a sheet on which the optical signal conduits are placed.

* * * * *